United States Patent
Rockwell

(10) Patent No.: US 6,627,090 B2
(45) Date of Patent: Sep. 30, 2003

(54) SUBMERSION DRUM SKIMMER

(76) Inventor: Robert John Rockwell, 61 Jupiter Cir., Violet, LA (US) 70092

( * ) Notice: Subject to any disclaimer, the term of this patent is extended or adjusted under 35 U.S.C. 154(b) by 18 days.

(21) Appl. No.: 09/893,911

(22) Filed: Jun. 27, 2001

(65) Prior Publication Data
US 2002/0000411 A1 Jan. 3, 2002

Related U.S. Application Data
(60) Provisional application No. 60/214,978, filed on Jun. 29, 2000.

(51) Int. Cl.$^7$ ................................................. E02B 15/04
(52) U.S. Cl. .................... 210/776; 210/242.3; 210/923
(58) Field of Search .......................... 210/242.1, 242.3, 210/523, 540, 776, 923

(56) References Cited

U.S. PATENT DOCUMENTS

| | | | | |
|---|---|---|---|---|
| 3,685,653 A | * | 8/1972 | Van Stavern et al. ....... 210/776 |
| 3,762,558 A | * | 10/1973 | Anderson ................. 210/242.3 |
| 3,966,615 A | * | 6/1976 | Petchul et al. ........... 210/242.3 |
| 3,968,071 A | * | 7/1976 | De Voss .................. 210/242.3 |
| 4,013,561 A | * | 3/1977 | Murphy ................... 210/242.3 |
| RE30,729 E | * | 9/1981 | Farrell et al. ............... 210/923 |
| 4,514,299 A | * | 4/1985 | Ayroldi ...................... 210/523 |
| 5,030,363 A | * | 7/1991 | Pole .......................... 210/776 |
| 5,316,672 A | * | 5/1994 | Wilson et al. ........... 210/242.3 |
| 5,792,350 A | * | 8/1998 | Sorley et al. ............... 210/923 |

* cited by examiner

Primary Examiner—Christopher Upton
(74) Attorney, Agent, or Firm—Wyatt, Tarrant & Combs, LLP

(57) ABSTRACT

An apparatus for collecting oil from a surface of a water body comprising a drum, the drum rotatably mounted on a vessel such that a lower portion of the drum is positioned below a waterline of the vessel, and a wiper member on the vessel, the wiper member positioned and configured to wipe oil from the drum below the surface of the water body. Wiped oil is collected below the surface of the water body through a series of collection tanks. A dryer wiper wipes water from an unsubmerged portion of the drum to improve oil uptake.

16 Claims, 3 Drawing Sheets

SUBMERSION DRUM SKIMMER

CROSS-REFERENCE TO RELATED APPLICATIONS

This patent application relates to, and claims priority from, Provisional Patent Application Ser. No. 60/214,978, filed on Jun. 29, 2000, which is pending.

FIELD OF THE INVENTION

The present invention relates to devices and methods for removing oil from the surface of a water body, and more particularly to devices and methods for removing oil from drum skimmers below the surface of water bodies.

BACKGROUND OF THE INVENTION

When oil is spilled into a water body, such as through damage to an oil tanker, the spilled water tends to form a thin film on the surface of the water body. This film is sometimes referred to as an oil slick or sheen. Oil films are detrimental to the marine environment, and can further damage shorelines if allowed to drift ashore.

Many different apparatuses and methods have been developed for collecting spilled oil from the surface of water bodies. One apparatus that has found widespread use for collecting spilled oil is the drum skimmer. Prior art drum skimmers consist generally of a cylindrical drum that is rotatably mounted on a floating vessel or on a platform. The longitudinal axis of rotation of the drum is preferably mounted substantially parallel to the surface of the body of water. A lower portion of the drum is partially submerged in the body of water. As the drum rotates through oil floating on the surface of the water body, oil adheres to the surface of the drum. Oil is then removed from the surface of the drum, typically by use of a scraper or wiper blade, and is diverted into a collection tank or hopper for disposal. Examples of rotating drum oil and related collection devices can be found in U.S. Pat. No. 3,576,257 (Yates); U.S. Pat. No. 3,685,653 (Van Stavern et al.); U.S. Pat. No. 3,947,360 (Fast); U.S. Pat. No. 4,013,561 (Murphy); U.S. Pat. No. 4,173,536 (McCall); U.S. Pat. No. 4,514,299 (Ayroldi); U.S. Pat. No. 4,957,636 (Wilson); U.S. Pat. No. 5,030,363 (Pole); U.S. Pat. No. 5,522,990 (Davidian); U.S. Pat. No. 5,380,431 (Newsom); 5,618,420 (Stella).

Up to now, prior art drum skimmers have focused on scraping or wiping oil from the drum surface at points above the surface of the water. Through observation of drum skimmers, the inventor has discovered that as oil is pulled underwater along the surface of the drum, the oil remains adhered only on the downwardly turning half of the drum. Large amounts of oil are pulled under on the downwardly turning half of the drum. However, as soon as a point of the drum passes from the downwardly turning half to the upwardly turning half of the drum, oil rapidly begins to fall back into the water. At the point where the upwardly turning half of the drum exits the water, only a thin film of oil remains adhered to the surface of the drum. Prior art apparatuses and methods have been directed to scraping off or otherwise removing this thin film oil, at locations above the surface of the water body. It is believed that the problem of oil loss on the upwardly turning half of the drum was unknown to prior practitioners of the art. The present invention provides apparatuses and methods for solving the problems associated with oil loss, and in doing so takes advantage of certain heretofore unknown features of the oil loss phenomenon.

Through further experiments and observations, the inventor has also discovered that dry drums collect oil much more efficiently than wet drums. Accordingly, apparatuses and methods for drying the outer surface of drums are incorporated herein.

There is thus a need for an oil collection apparatus having the following characteristics and advantages over the prior art.

OBJECTS AND SUMMARY OF THE INVENTION

It is an object of the invention to provide an oil collection apparatus that collects oil from a surface of a water body by scraping a drum below a surface of the water body.

It is another object of the invention to provide an oil collection apparatus that improves oil collection by wiping water from the surface of unsubmerged regions of the drum.

Accordingly, an apparatus for collecting oil from a surface of a water body is provided comprising, generally, a drum, the drum rotatably mounted on a vessel such that a lower portion of the drum is positioned below a waterline of the vessel, and a wiper member on the vessel, the wiper member positioned and configured to wipe the drum below the waterline to thereby wipe oil from the drum below the surface of the water body. In order to collect the wiped oil, the vessel is provided with an oil collection tank. The oil collection tank has an open bottom. The open bottom is positioned below the water line of the vessel. The oil collection tank is positioned such that wiped oil flows through the open bottom and into the oil collection tank. The vessel is also provided with an oil deposit tank. The oil deposit tank has a closed bottom. The closed bottom is positioned below the waterline of the vessel. An oil transfer opening is provided between the oil collection tank and the oil deposit tank. The oil transfer opening is positioned to drain wiped oil from the oil collection tank into the oil deposit tank. In order to minimize draining of water from the collection to the deposit tank, a weir can be positioned in the oil deposit tank along the oil transfer opening. An oil storage tank is also provided. In one preferred embodiment, the oil storage tank is incorporated into the vessel. However, when the apparatus is used in the form of a pit skimmer, the oil storage tank can be separate from the apparatus (e.g. an oil tank, a tanker truck, or a barge). A pump or siphon is provided for transferring wiped oil from the oil deposit tank to the oil storage tank.

In order to improve uptake of oil during rotation of the drum, a dryer wiper member can be provided on the vessel. The dryer wiper is positioned to wipe water from an unsubmerged portion of the drum to thereby dry the drum.

In one preferred embodiment, the apparatus is provided with a second drum and a second wiper member, in the manner described above. The first drum and the second drum are preferably positioned on opposite sides of the oil collection tank.

PREFERRED EMBODIMENTS OF THE INVENTION

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
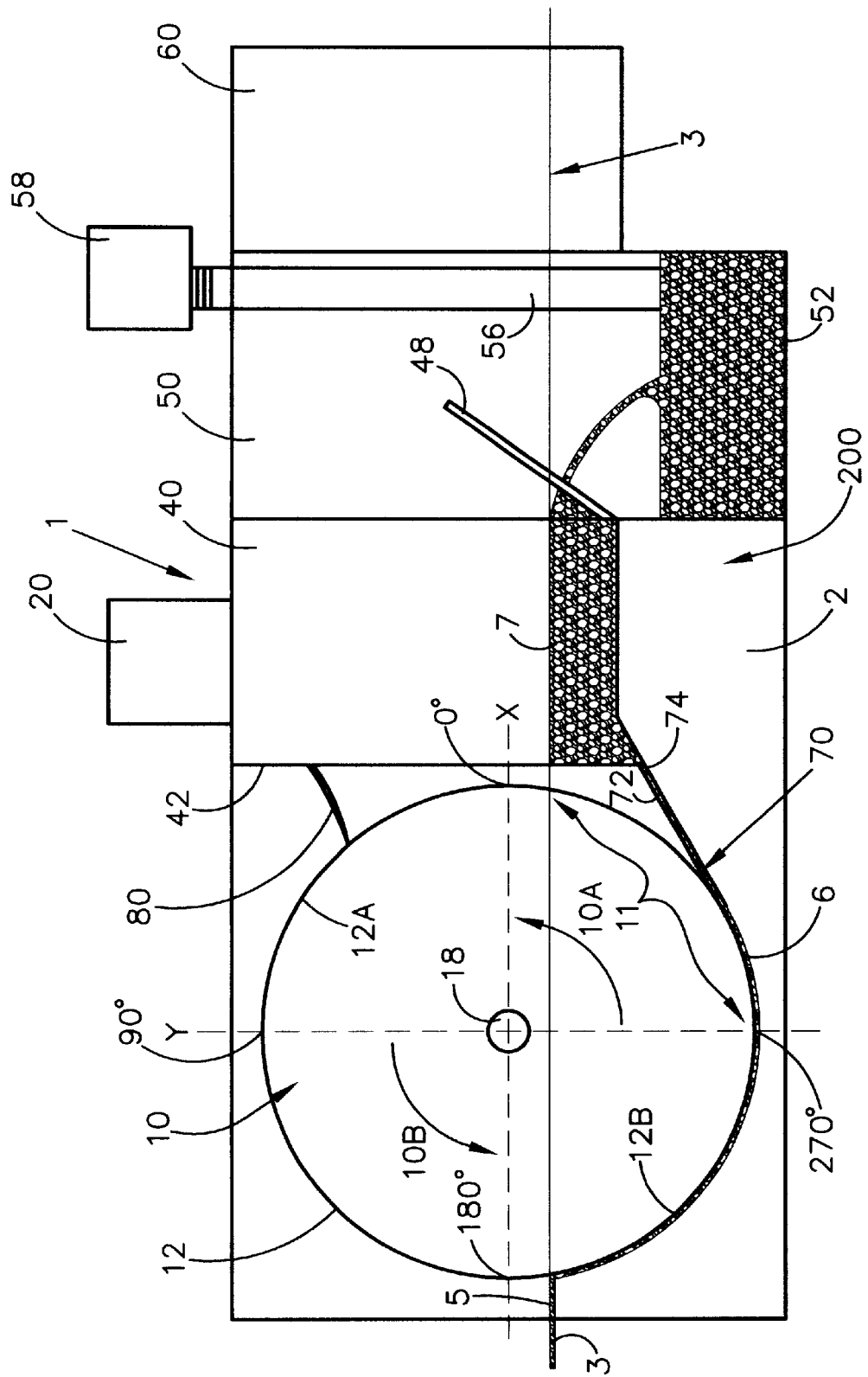
FIG. 1 is a cross-sectional side view of one preferred embodiment of the invention on a pit skimmer.

FIG. 1 shows a portion of a body of water 2 on which the apparatus of the invention 1 is used. The body of water has a surface 3. Oil 5 is shown floating on the surface 3 of the water body 2.

As shown in FIG. 1, a preferred embodiment of the submersion drum skimmer of the invention 1 is composed primarily of a floating vessel 200, a drum 10 rotatably suspended or disposed in the vessel 200, an oil wiper blade 70, and an oil collection means such as oil collection tank 40 and oil deposit tank 50. In lieu of a floating marine vessel 200, the drum 10 and associated components may also be mounted on a non-floating frame or other fixed or anchored structure, in a manner well known to those of skill in the art. The apparatus of the invention 1 is provided with a drive means 20 for rotating drum 10, as well as for optionally propelling the vessel 200. The drive means 20 may be a diesel, gas, electric, hydraulic, or pneumatic engine. The drum 10 is provided with a shaft 18 passing through the central axis of rotation 18. Portions of the shaft 18 extend from either end of the drum 10 to provide flanges 18 for supporting the drum 10 on the frame of the vessel 200, and for rotating the drum 10 with the drive means 20. Sprockets may be provided on the shaft/flange 18 as needed in order to rotate the drum 10 with the drive means 20. The drum 10 can turn on a flange, pillar block bearings or the like, and can be driven by a chain, VEE belt, direct drive, or the like. The drum 10 may be built into the vessel at various locations, e.g. bow, stem, midship, as desired. In a preferred embodiment shown in FIG. 4, the bow of the vessel 200 is provided with an open socket spanned by a pair of generally parallel port and starboard appendages 62. In this configuration, the drum 10 is rotatably disposed at the bow end portion of the hull generally in between the port and starboard appendages, in a manner described below.

Figure 2:
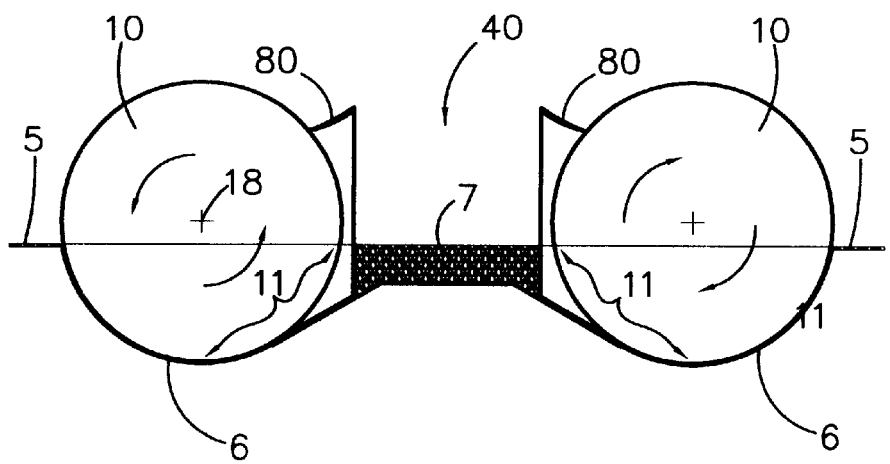
FIG. 2 is a fragmentary side view of one preferred embodiment of the invention, illustrating the use of a pair of drums.

As shown in FIG. 1, the drum 10 is cylindrical when viewed along longitudinal axis of rotation 18, such that the drum 10 has an outer surface 12 that is convex. The drum 10 is preferably constructed of any hard material, such as aluminum, stainless steel, fiberglass, or carbon fiber. The drum 10 preferably has a hollow interior and closed ends. The relative positions of the rotating drum 10 will be described herein relative to the arbitrarily assigned fixed axes X and Y shown in FIG. 1, where the X axis is parallel to the water surface 3, the Y axis is perpendicular to the water surface 3, and the X and Y axis intersect at the axis of rotation 18 of the drum 10. For descriptive purposes, the drum 10 can be assigned degree positions relative to the X and Y axes, as shown in FIG. 1. As described herein, the 0 degree positioned will be assigned to the point where the X axis intersects the upwardly turning half 10A of the outer surface 12 of the drum 10, and the 180 degree position will be assigned to the point where the X axis intersects the downwardly turning half 10B of the surface 12 of the drum 10. When positioned in the water body 2, the drum 10 has an unsubmerged surface 12A and a submerged surface 12B. Relative to the water surface 3, the drum 10 has a downwardly turning half 10B (extending from 90 to 270 degrees) and an upwardly turning half 10A (extending from 270 degrees to 90 degrees). The drum 10 further has an upwardly turning submerged region 11. The submerged surface 12B can be made smaller or larger by raising or lowering the drum 10 relative to the water surface 3, depending on operating needs. FIGS. 1–2 show preferred amounts of submergence of the drum 10. In FIG. 1, the drum is submerged such that the upwardly turning submerged region 11 extends from approximately 270 to 350 degrees. FIG. 1 further shows oil 6 on the surface of drum, as well as collected oil 7 that has been scraped from submerged surface 12B of drum 10.

The oil wiper 70 is positioned so as to scrape or wipe oil 6 from the outer surface 12 of the drum 10 during operation. A key feature of the invention is the position of the oil wiper blade 70 below the surface 3 of the water body 2. The wiper blade 70 is positioned so as to scrape the submerged surface 12B of the drum in the upwardly turning submerged region 11 of the drum 10. The wiper blade 70 is preferably positioned between the 270 degree and the 315 degree points shown in FIG. 1, so as to minimize loss of oil 6 from the surface 12 of the upwardly turning submerged region 11 of the drum 10. FIG. 1 shows a preferred embodiment of the invention 1 in which the blade 70 is positioned at approximately the 300 degree point. As the drum 10 rotates into contact with the wiper blade 70 (the drum being shown rotating counterclockwise in FIG. 1), the wiper blade 70 scrapes oil 6 from the surface 12 of the drum. Because oil floats in water, rather than sinking or dispersing evenly into the water body 2, the scraped oil 7 can be readily contained and diverted such that collected oil 7 collects in a collection tank 40 (described below). With the oil wiper blade 70 positioned relative to the upwardly turning submerged region 11 of the drum 10, substantially all of the oil pulled under by the drum 10 can be recovered from the submerged surface 12B of the drum 10 and collected in the collection hopper 40. Experiments conducted by the inventor indicate that with the wiper 70 positioned as described herein, oil recovery can be increased by as much as 80 percent. The inventor's experiments and observations indicate that recovery rate does not change with the depth of submersion of the drum, i.e. whether the drum 10 is slightly submerged in the water body 2 or halfway submerged, the oil recovery rate appears to stay about the same.

The oil wiper blade 70 is attached to the apparatus by a means such as extension member 72. The extension member 72 preferably comprises a plate-like structure extending along the length of the wiper blade 70 and the drum 10. The extension member 72 is mounted to the frame of the vessel or like body 200 so as to support and hold the wiper blade 70 against the outer surface 12 of the drum 10. The extension member 72 is preferably made of steel, aluminum or other metals, but may be made of any material of sufficient strength and durability to hold the wiper blade 70 in position against the surface 12 of the drum 10. In FIG. 1, the extension member 72 is shown fixedly attached to a lower edge of an outer wall 42 of the oil collection tank or hopper 40. The extension member 72 is configured and positioned so as to assist in containing and diverting collected oil 7 into the collection hopper 40. The lower surface 74 of the extension member 72 serves as an upper barrier to the collected oil 7. As shown in FIG. 1, the extension member is shown upwardly inclined from the drum 10 to the lower end of the wall 42 of the collection tank 40, such that wiped or collected oil 7 floats upward along the lower surface 74 of the extension member 72 and into the tank 40.

The wiper blade 70 preferably consists of ultra high molecular weight plastic ("UHMW"), but can alternatively be made of rubber, plastic, or other semi-rigid durable materials. The inventor has discovered that wiper blades 70 made of UHMW are particularly durable and effective. UHMW wiper blades 70 can be secured directly to the extension member 72 using bolts, screws, or the like, as shown in FIG. 1. This embodiment firmly compels the UHMW wiper blade 70 against the outer surface of the drum 10, such that oil contacting the blade 70 during rotation of the drum 10 passes over the blade 70, separating much of the oil from the drum 10. The wiper 70 may be constructed of a metallic body with a wiper 70 affixed thereto, such as by bolts, in a manner known to those of skill in the art. The wiper 70 can also be pivotally mounted to the extension member 72, such as by a piano hinge. Springs can be provided for urging the wiper 70 into engagement with the outer surface 12 of the drum 10. Alternatively, the extension member 72 may serve as the metallic body, with the rubber or polymeric wiper 70 affixed directly to the extension member 72, such as by bolts.

As shown in FIG. 1, the oil collection tank or hopper 40 is a container comprising generally a set of contiguous downwardly extending walls, preferably of rectangular configuration. The bottom of the oil collection tank 40 is open or at least partially open, so as to allow collected oil 7 to rise into the tank. The top of the tank 40 may be closed, such as by a cover or the deck of the vessel 200. Collected oil 7 may be siphoned directly from the collection tank 40. In a preferred embodiment, collected oil 7 is diverted into an oil deposit tank or hopper 50. As shown in FIG. 1, the deposit tank 50 is preferably positioned adjacent to the collection tank 40. A weir 48 is preferably positioned between the oil collection tank 40 and the oil deposit tank 50, so as to allow collected surface oil 7 to drain into the deposit tank 50, preferably without allowing appreciable amounts of water 2 to drain into the deposit tank 50 by gravity. The oil deposit tank 50 has a closed bottom 52. The oil deposit tank 50 is provided with a pumping system. FIG. 1 shows a lower end of a pump siphon hose 56. The pump siphon hose 56 operably connected to a conventional pump means 58. The oil deposit tank 50 may be provided with a level control so as to automatically pump out deposited oil 7.

The embodiment shown in FIG. 1 is a pit skimmer, in which the vessel 200 is not provided with a self-contained oil storage tank. Pit skimmers are particularly effective in small or shallow areas, or in oil spills that are located near a shoreline, such that collected oil can be readily pumped from the device 1 into an on-shore oil tanker or other oil storage facility. However, when collecting oil in large areas, open water bodies, or in rough seas, it may be desirable to use a larger oil collection apparatus 1 such as the type shown in FIG. 4.

Figure 4:
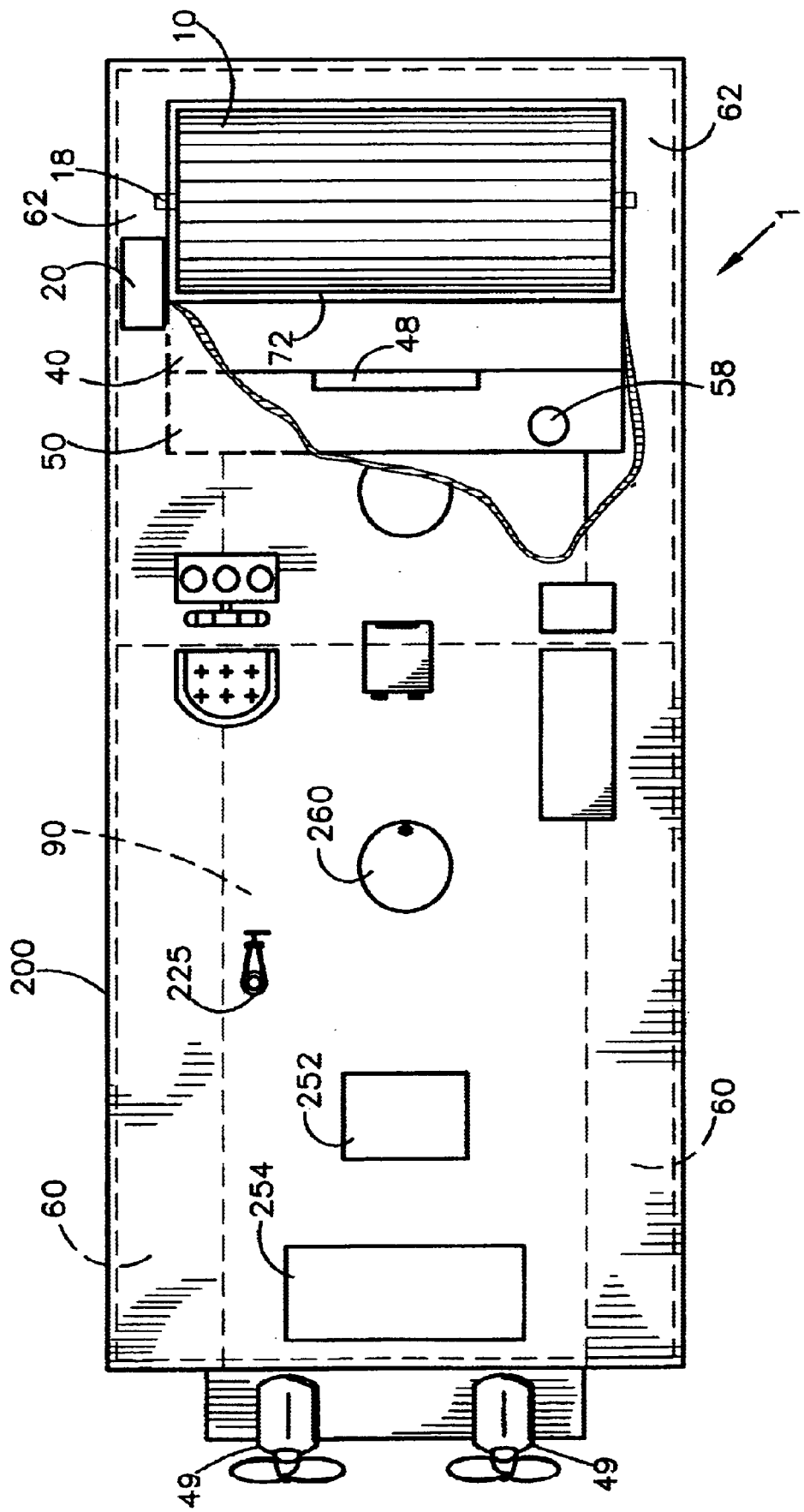
FIG. 4 is a top view of one preferred embodiment of the invention arranged on a bow of a vessel, showing a partial cutaway of a deck of the vessel.

FIG. 4 is a top view of one preferred embodiment of the invention 1 arranged on a bow of a vessel 200 and showing a partial cutaway of a deck of the vessel 200. The vessel 200 has a floatable hull. The hull has an oil storage tank 90 for storing oil collected by the device. The hull also has float tanks 60, such as the pair of wing tanks shown in FIG. 4. A pair of pontoons 62 extend fore of the bow of the floatable hull. As shown in FIG. 4, the pontoons 62 are spaced apart to form an oil collection area. The pontoons 62 are preferably buoyant so as to provide additional support for the drum 10 and buoyancy to the vessel 200, but non-floating extension members 62 can be substituted for buoyant pontoons 62. A drum 10 is rotatably mounted in the oil collection area via a drive-shaft member 18. The drive-shaft member 18 preferably extends entirely through the drum, and is welded or otherwise secured to a pair of end plates positioned in either end of the drum. The drum 10 is mounted such that a rotational axis of the drum 10 is aligned substantially parallel to the surface of the water body and substantially perpendicular to a centerline of the hull of the vessel 200. A bottom edge of the drum 10 is positioned below a waterline of the floatable hull of the vessel 200. A drive means 20, selected from the types mentioned above, is provided for selectively rotating the drive-shaft member 18 to thereby rotate the drum 10. An oil collection tank 40 is positioned aft and adjacent the drum 10. As mentioned above, the oil collection tank 40 has an open bottom that is positioned below the water line of the vessel 200. A wiper member (not shown in FIG. 4; see FIG. 1) is positioned and configured to wipe oil from an upwardly rotating submerged region of the drum and to divert the wiped oil into the oil collection tank 40 via the open bottom of the oil collection tank 40. An oil deposit tank 50 is positioned aft and adjacent the oil collection tank 40. The oil deposit tank 50 has a closed bottom 52 that is positioned below the waterline of the vessel 50. As described above with regard to FIG. 1, an oil transfer opening is provided between the oil collection tank 40 and the oil deposit tank 50, the oil transfer opening being positioned to drain wiped oil from the oil collection tank 40 into the oil deposit tank 50. As shown in FIG. 4, a weir 48 is preferably positioned in the oil deposit tank 50 to minimize draining of water into the deposit tank 50. A pump means 58 is provided for transferring wiped oil from the oil deposit tank 50 to the oil storage tank 90. FIG. 4 also shows various features of the vessel 200, such as outboard motors 49 for propelling the vessel 200, an oil transfer pump 225 for transferring collected oil from the oil storage tank 90, a console 252, an auxiliary power unit 254, and hatches 260 to access the tanks.

The inventor has also discovered that the use of a dry drum 10 improves oil recovery rate. When a dry drum contacts the surface oil 5, the surface 12 of the drum 10 pulls and collects oil 6 much more efficiently. In order to take advantage of this principle, a dryer wiper 80 can be provided. As shown in FIG. 1, the dryer wiper 80 is positioned so as to wipe the outer surface 12 of the drum 10 at a point adjacent to where the drum surface 12 exits the water. In FIG. 1, the dryer wiper 80 is positioned at approximately the 35–40 degree point. When tightly positioned against the drum surface 12, the dryer wiper 80 will remove all significant amounts of water. Small amounts of residual water may remain on the drum surface 12, but the overall effect is to improve the oil recovery rate.

Figure 3:
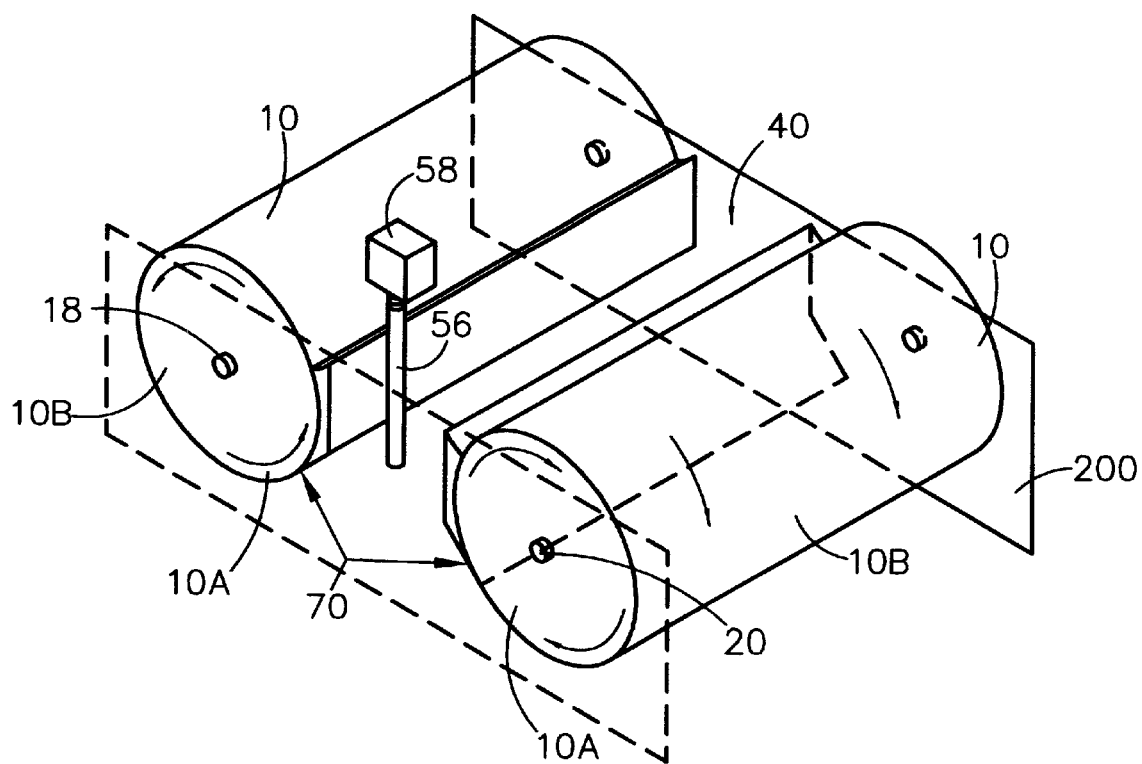
FIG. 3 is a perspective fragmentary view of the embodiment of FIG. 2.

FIGS. 2 and 3 show an alternative preferred embodiment that uses a two drum 10 configuration. The drums 10 are spaced apart in generally parallel relation to one another. A central collection tank or hopper 40 is positioned between the two drums 10. A wiper blade 70 is positioned along each drum 10 in the manner described above. The drums 10 rotate in opposite directions, such that oil 6 collected on the surface of the drums 10 is rotated toward the central collection tank 40. As the drums 10 rotate over the wiper blades 70, the oil is scraped from the drum and diverted into the central collection tank 40, in the manner described above. As shown in FIG. 2, a dryer wiper 80 may be provided on each of the drums, in the manner described above.

The vessel 200 will generally be of typical construction for oil skimming devices. The vessel will be provided with a marine hull that can float on a water surface 3. The marine hull will have an upper portion, which may include a deck for supporting the drive means 20, pumps 58, a vessel operator, and the like, and a submerged portion. Propulsion units such as one or more outboard engines may be provided on the hull, preferably in the stern portion. The vessel is preferably provided with a combination of holding tanks, displacement tanks, ballast tanks, self-leveling systems and the like, in a manner well known to those of skill in the art. The vessel 200 may be provided with a wing tank, and fore and aft ballast system. The tanks are ballasted so as to keep the vessel and drum 10 at desired levels. Float tank 60 is shown in FIG. 1. The vessel can also be provided with spud drive setups. The spud guide can be used to hold the vessel at desired locations. The guides hold the vessel, while also allowing the vessel to change elevation in accordance with the water level.

In operation, the apparatus of the invention is used by maneuvering or transporting the device 1 to an oil slick. The drive means 20 is then used to rotate the drum 10. As oil is collected in the collection vessel 50, the pump means 58 is operated to pump the oil 7 to an oil collection tank. The vessel can be raised or lowered as needed, such as by adjusting the ballast system or adjusting the height of the device on spud drive setups. The submersion drum skimmer of the invention 1 can be used for coastal, offshore, oil pit and API separators.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. An apparatus for collecting oil from a surface of a water body comprising:
    a drum, said drum rotatably mounted on a vessel such that a lower portion of said drum is positioned below a waterline of said vessel, and
    a wiper member on said vessel contacting an outer surface of said drum, said wiper member positioned and configured to wipe said drum below said waterline to thereby wipe oil from said drum below the surface of the water body.

2. An apparatus for collecting oil from a surface of a water body comprising:
    a drum, said drum rotatably mounted on a vessel such that a lower portion of said drum is positioned below a waterline of said vessel,
    a wiper member on said vessel, said wiper member positioned and configured to wipe said drum below said waterline to thereby wipe oil from said drum below the surface of the water body, and
    an oil collection tank on said vessel, said oil collection tank having an open bottom positioned below said water line of said vessel, said oil collection tank positioned to collect wiped oil via said open bottom.

3. The apparatus of claim 2, further comprising an oil deposit tank in said vessel, said oil deposit tank having a closed bottom, said closed bottom positioned below said waterline of said vessel, and an oil transfer opening between said oil collection tank and said oil deposit tank, said oil transfer opening positioned to drain wiped oil from said oil collection tank into said oil deposit tank.

4. The apparatus of claim 3, further comprising an oil storage tank in said vessel, and a pump for transferring wiped oil from said oil deposit tank to said oil storage tank.

5. The apparatus of claim 3, further comprising a weir positioned in said oil deposit tank along said oil transfer opening to thereby minimize draining of water into said deposit tank.

6. The apparatus of claim 2, wherein said wiper member comprises a wiper blade attached to said vessel by an extension member, said extension member inclined upward from said wiper blade to said collection tank to thereby facilitate flow of wiped oil to said collection tank.

7. The apparatus of claim 2, further comprising a dryer wiper member on said vessel, said dryer wiper positioned to wipe water from an unsubmerged portion of said drum to thereby dry said drum to thereby improve collection of oil by the apparatus.

8. The apparatus of claim 2, further comprising a second drum, said second drum rotatably mounted on said vessel such that a lower portion of said second drum is positioned below a waterline of said vessel, and
    a second wiper member on said vessel, said second wiper member positioned and configured to wipe said second drum below said waterline to thereby wipe oil from said second drum below the surface of the water body, and to divert said wiped oil into said oil collection tank.

9. The apparatus of claim 8, wherein said drum and said second drum are positioned on opposite sides of said oil collection tank.

10. An apparatus for collecting oil from a surface of a water body comprising:
    a floatable hull, said hull having an oil storage tank therein,
    a pair of pontoons extending fore of a bow of said floatable hull, said pontoons spaced apart to thereby form an oil collection area therebetween,
    a drum, said drum rotatably mounted in said oil collection area via a driveshaft-member, a rotational axis of said drum aligned substantially parallel to the surface of the water body and substantially perpendicular to a centerline of said floatable hull, a bottom edge of said drum positioned below a waterline of said floatable hull,
    a drive means for selectively rotating said drive-shaft member to thereby rotate said drum,
    an oil collection tank on said vessel, said oil collection tank having an open bottom positioned below said water line of said vessel, said oil collection tank positioned aft and adjacent said drum,
    a wiper member on said vessel, said wiper member positioned and configured to wipe oil from an upwardly rotating submerged region of said drum and to divert said wiped oil into said oil collection tank via said open bottom of said oil collection tank,
    an oil deposit tank aft and adjacent said oil collection tank, said oil deposit tank having a closed bottom, said closed bottom positioned below said waterline of said vessel,
    an oil transfer opening between said oil collection tank and said oil deposit tank, said oil transfer opening positioned to drain wiped oil from said oil collection tank into said oil deposit tank, and
    a pump for transferring wiped oil from said oil deposit tank to said oil storage tank.

11. The apparatus of claim 10, further comprising a dryer wiper member on said vessel, said dryer wiper positioned to wipe water from an unsubmerged portion of said drum to thereby dry said drum to thereby improve collection of oil by the apparatus.

12. The apparatus of claim 10, further comprising a weir positioned in said oil deposit tank along said oil transfer opening to thereby minimize draining of water into said deposit tank.

13. The apparatus of claim 10, wherein said wiper blade is attached to said vessel by an extension member, said extension member inclined upward from said wiper blade to said collection tank to thereby facilitate flow of wiped oil to said collection tank.

14. A method of collecting oil from an oil spill floating on a surface of a water body comprising:

rotating a drum in the oil spill, wiping oil from an outer surface of said drum with a wiper contacting said surface, said wiping taking place below the surface of the water body, and diverting said wiped oil to an oil collection tank, said diversion taking place below the surface of the water body.

15. The method of claim 14, further comprising transferring said wiped oil from said oil collection tank to an oil deposit tank.

16. The method of claim 15, further comprising transferring said wiped oil from said oil deposit tank to an oil storage tank.

* * * * *